July 13, 1965　　　　L. THURLOW　　　　3,194,609

SPROCKET AND CHAIN DRIVE

Filed March 30, 1964　　　　　　　　　　4 Sheets-Sheet 1

INVENTOR.
LLOYD THURLOW
BY
Braddock and Braddock
ATTORNEYS

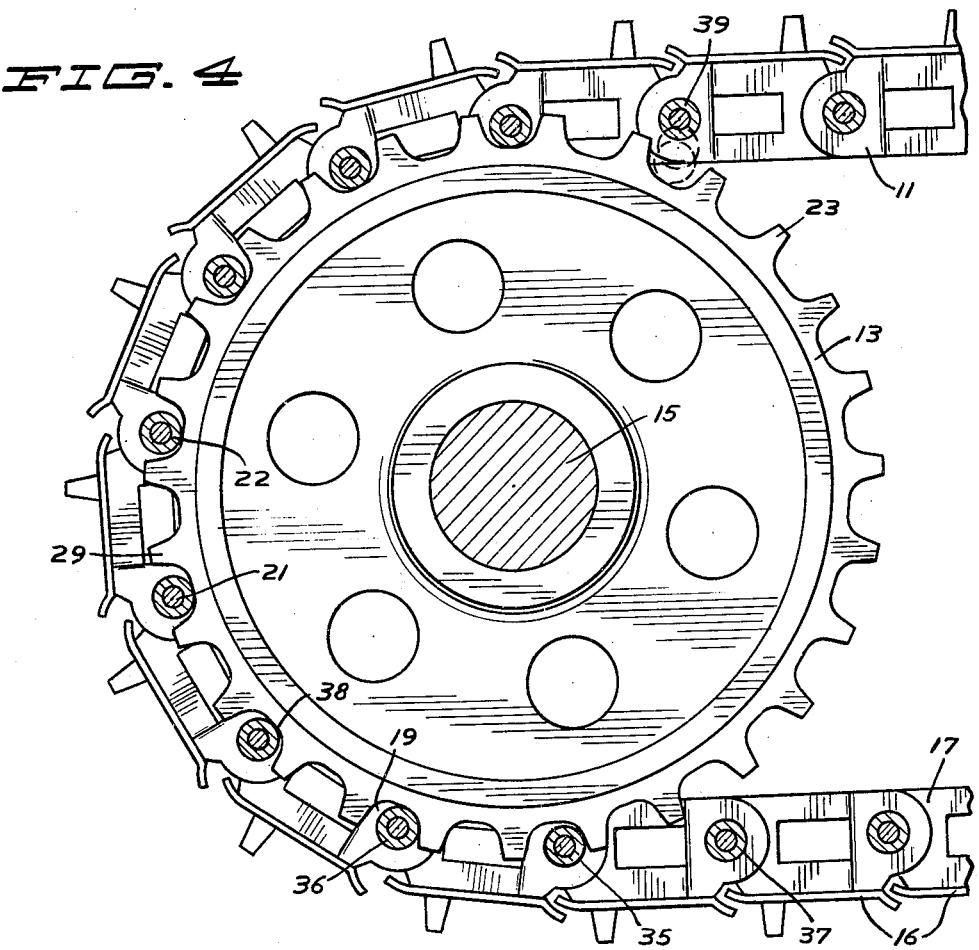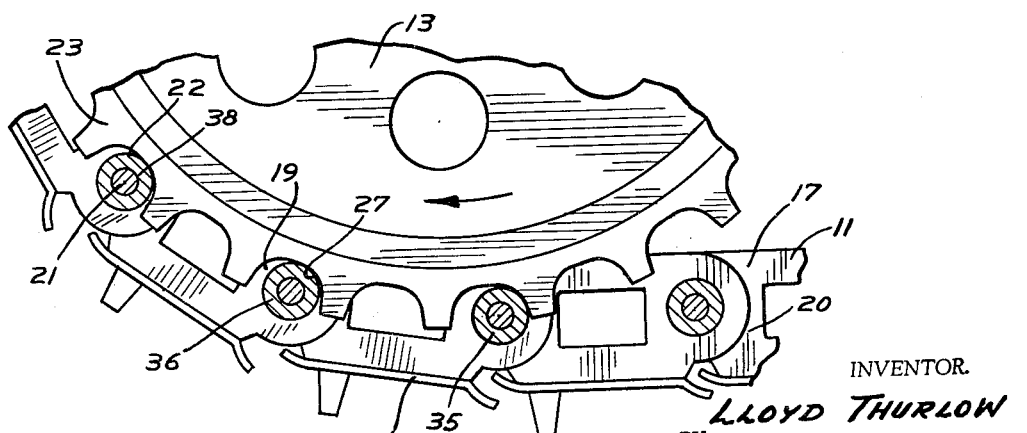

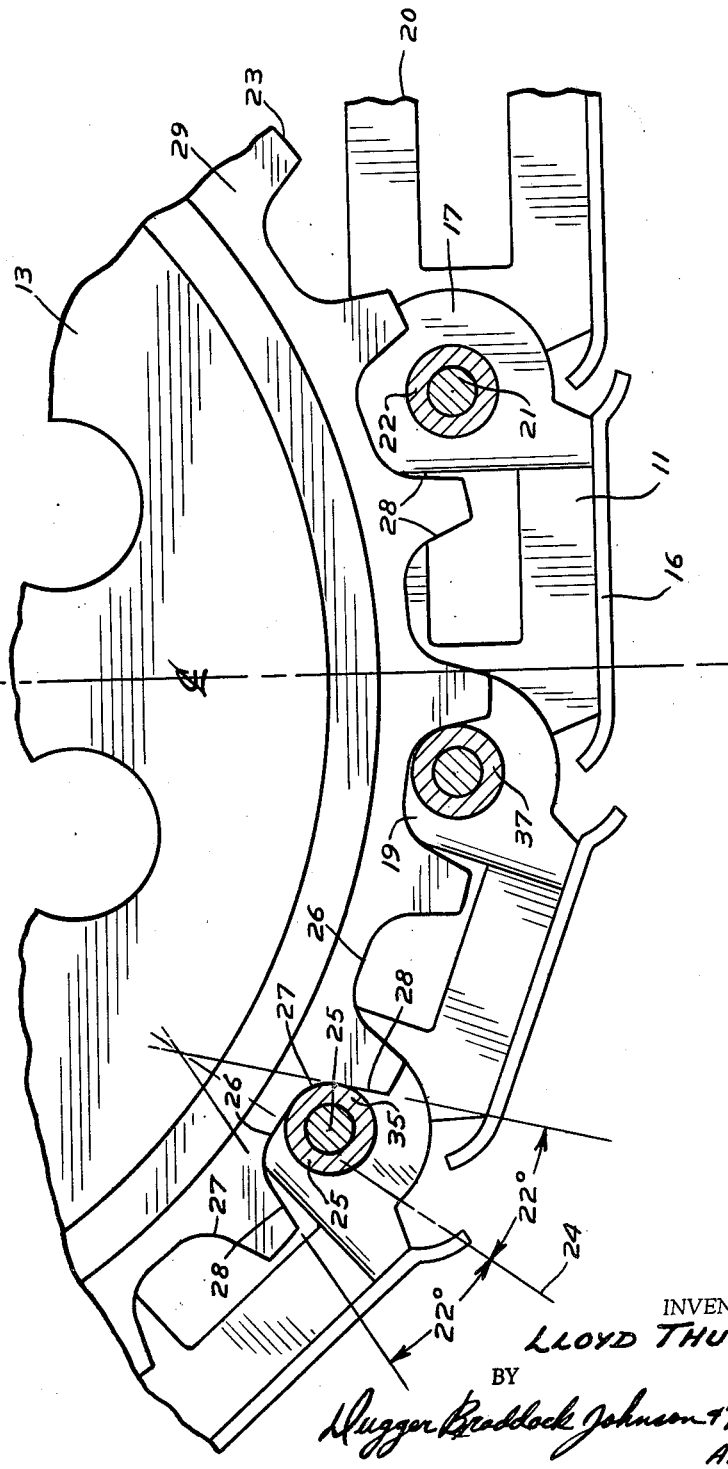

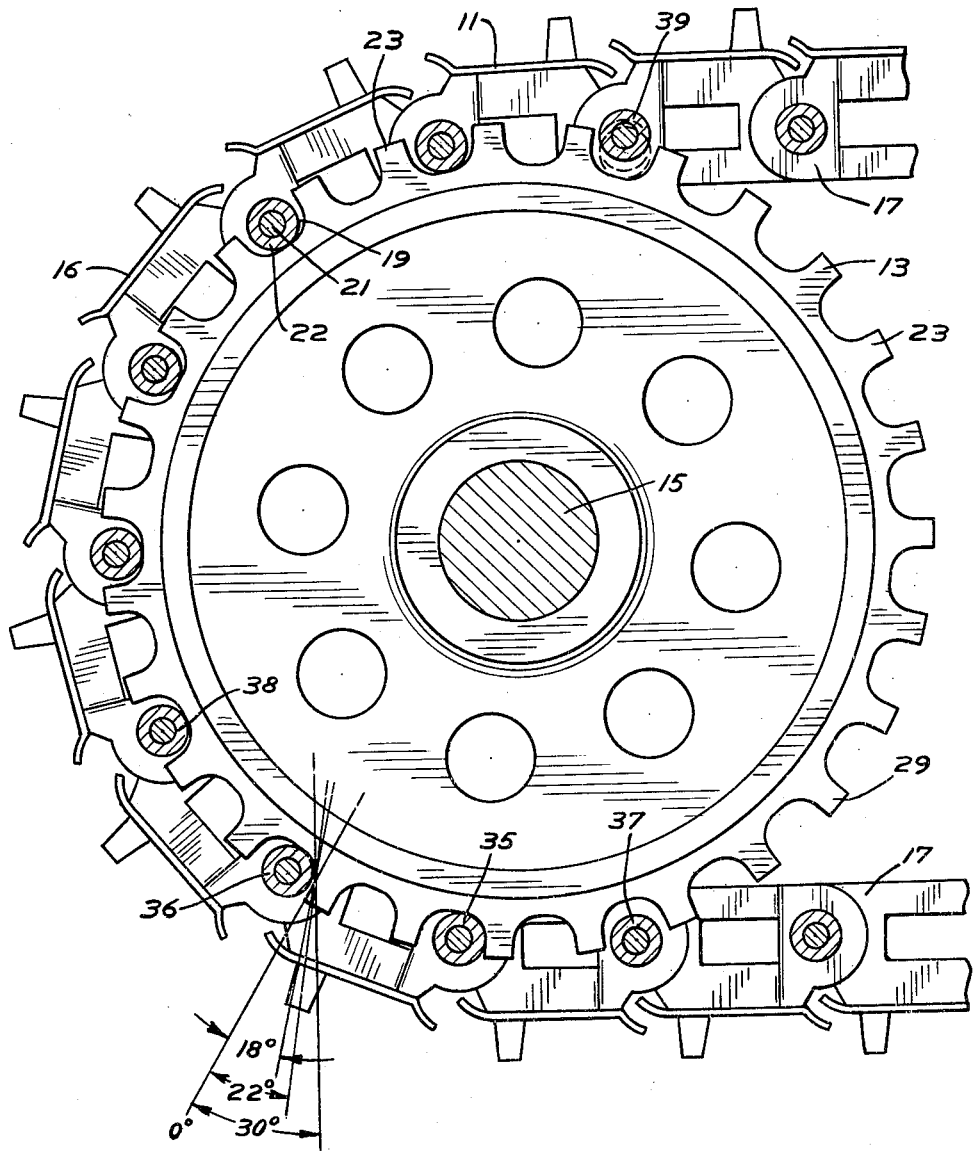

United States Patent Office 3,194,609
Patented July 13, 1965

3,194,609
SPROCKET AND CHAIN DRIVE
Lloyd Thurlow, Wahpeton, N. Dak.
Filed Mar. 30, 1964, Ser. No. 356,363
5 Claims. (Cl. 305—57)

This application is a continuation-in-part of applicant's co-pending application, Serial No. 167,465, filed January 10, 1962.

This invention has relation to a drive mechanism including a sprocket and a roller-type chain and is particularly useful in conditions where foreign materials can get between the rollers or bushings of the chain and the bushing receptacles located between adjacent teeth on the sprocket.

A device of the present invention will find use, for example, on crawler tractors where a track roller chain having track shoes thereon is driven by a drive sprocket. Such a device can include a sprocket having a relatively small, steep tooth angle and an effective pitch less than the pitch of a chain with which it is drivingly associated. Such a sprocket can have a part-rounded portion tangent to the tooth face for receiving a chain bushing and will include a substantially flat root portion tangent to this part-rounded portion.

When a sprocket and chain track drive is operated in a pit or trench or in loose sand, for example, the top of the tracks and the lower portion of the sprocket will often be covered with sand. This sand will lie on top of the rollers or bushings of the chain and will be forced upward into the bushing receptacle between adjacent teeth on the sprocket as the bushing moves into this receptacle due to the sprocket driving forward over the chain.

In sprocket and chain drives now of commerce, this sprocket root area between adjacent teeth is customarily substantially cylindrical in shape and either approximates the size of the chain bushing or is slightly larger in diameter than the bushing. The tooth angle typically approximates 35 degrees. The chain pitch is the same as the effective pitch of the sprocket. The action of the bushing as the sprocket rides forward onto it and the sand on top of it is to compress the sand into the bushing receptacle in such a manner that it cannot escape from between the bushing and the receptacle. This results in a build up of compacted sand in the sprocket receptacle at the root area, causing the bushing to ride out on the tooth face away from the root area. Because the pitch of the chain is the same as that of the sprocket, the next bushing to come in contact with a tooth face will do so at the same distance out from the root area even if no obstruction lies between the next bushing and the corresponding bushing receptacle root area. As long as the drive mechanism is under load, each bushing will continue to ride high up on its adjacent tooth face, thus effectively increasing the pitch diameter of the sprocket and tending to cause the track chain to stretch. This will cause the forces transmitted by the chain on a load line defined as passing through the axes of the bushings to become greatly increased. Because of the large, flat tooth angle, all stress on the chain along this load line tends to cause the bushings to slide along their adjacent tooth faces in direction outwardly from the center of the sprocket; and this great increase in force along the load line as the chain moves out from the roots of the teeth acts to further increase this tendency to slide out on the tooth faces.

This in turn eventually causes the bushings of the chain to slip over the ends of the teeth of the sprocket or it eventually causes some other damages or breakage to occur to the drive mechanism if the mechanism is constantly operated under conditions where foreign particles can get between the bushings and their aligned bushing receptacles. In some cases the entire final drive train has been broken when the crawler is working in sand. The down time and expense of making repairs on machines already in the field has been tremendous.

Other problems result from this tendency of the bushing of the chain to ride out of the sprocket tooth root when obstructions come between one such bushing and tooth root.

One such problem concerns the excessive friction generated between every bushing, side plate link, and pin in the chain due to the stretching of the chain as the effective pitch diameter of the sprocket with respect to the chain is increased. Overcoming this friction as the chain drive is used constitutes a very substantial loss in the effective power available for performing the work for which the drive mechanism was designed. This same friction causes excessive chain bushing wear.

Another such problem which likewise appreciably cuts the maximum power available from such a drive is the change in gear ratio which results from this increase in the effective pitch diameter of the drive sprocket as the chain bushings are forced to take positions farther from the center of the sprocket than that for which they were designed. Power losses of up to eight percent can be experienced as the chain runs out near the peak of the teeth. This often causes engine stalls under heavy load conditions.

In a sprocket and chain drive of the present invention, a leading edge of the bushing receptacle between adjacent teeth on the sprocket is constituted as a part-cylindrical surface having a diameter substantially equal to that of the outer periphery of the cylindrical bushing of the chain. A substantially flat root portion extends tangentially from this cylindrical portion at the root of the tooth. A tooth face extends tangentially away from the part-cylindrical portion at a relatively small tooth angle. This angle is defined as the angle of the plane of the tooth face to a plane passing through the axis of the sprocket in normal relationship to the substantially flat root portion; and usually will be between 18 and 22 degrees, although a sprocket having a zero tooth angle would be completely operative and a tooth angle of as large as 30 degrees has been used effectively.

In use, the sprocket is driven to roll onto a bushing of the chain. Because the pitch of the chain is greater than the effective pitch of the sprocket and because the preceding bushing is virtually in mating contact with the cylindrical portion of its aligned bushing receptacle, the oncoming bushing will first contact its aligned bushing receptacle up on the tooth face and spaced from the part-cylindrical portion of the bearing receptacle. As the sprocket turns, the forces on the chain are along a load line defined as a longitudinal line joining the axes of the chain pins and their concentric bushings.

As the sprocket continues turning, the preceding bushing moves with the sprocket off of the straight line which defines the load line of the oncoming chain links and this causes more force to be exerted on its adjacent tooth face by the oncoming bushing. Initially the angle of the tooth face with respect to the load line may be such that movement of the bushing into the part-cylindrical portion of the bushing receptacle will be resisted. As the sprocket turns, however, the tooth face very soon moves past a perpendicular relationship with respect to the load line and assumes an angle such that the force on the chain tends to cause the bushing to slide inwardly toward the center of the sprocket and into mating relationship with the part-cylindrical portion of its adjacent bushing receptacle. The preceding bushing will move slightly away from its adjacent tooth face in direction along the substantially flat root portion as this happens because the pitch of the chain is greater than the effective pitch of the sprocket.

Sand and other foreign materials between the bushing and its aligned bushing receptacle is pushed ahead of the bushing as it moves toward a mating relationship with its bushing receptacle. At the time a particular bushing is first forced into the root by the forces on the chain and the angular relationship of the tooth face to the effective direction of those forces, most of the force between the sprocket and the chain is being transmitted through that one particular bushing with a small part of it being transmitted by the preceding bushing until it completely unloads and by the next oncoming bushing as it contacts its tooth face and starts to load. This force is sufficient, it has been found, to pulverize the sand in the bushing receptacle and to force a major portion of it laterally out from between the bushing and the bushing receptacle. What remains is a kind of scum which appears to serve as a lubricant and so inhibits wear of the metal bushings and receptacles.

As stated, in the drive of the present invention, the distance between centers of adjacent bushings of the chain is greater than the distance between centers of the part-cylindrical portions of the bushing receptacles of the sprocket designed to mate with these adjacent bushings. The center distance between adjacent bushings exceeds that of the mating bushing receptacles by an amount such that while the first bushing at the bottom of the sprocket is in driving contacting relationship with the part-cylindrical portion of its corresponding bushing receptacle, the last bushing just about to leave contact with the sprocket will not be in intefering relationship to the tooth face opposite the part-cylindrical portion of its associated bushing receptacle.

It is an object of the present invention to provide an improved sprocket and roller-type chain drive.

It is a further object of the present invention to provide a sprocket and chain drive which will operate effectively in spite of the initial presence between the chain and the sprocket of foreign materials.

In the drawings,

FIG. 4 is a further enlarged fragmentary side elevational view of a drive sprocket and chain similar to that illustrated in FIG. 2 with parts in section and parts broken away and disclosing a sprocket having a tooth angle of approximately 22 degrees;

FIG. 5 is a still further enlarged, fragmentary view of the lower portions of the drive sprocket of FIG. 4, the parts being in the same relative position in the two views;

FIG. 6 is a still further enlarged fragmentary view of the sprocket of FIGS. 4 and 5 but with the sprocket further advanced on the chain; and FIG. 7 is a fragmentary side elevational view of a sprocket and chain drive similar to that shown in FIG. 4 with parts in section and parts broken away but disclosing a sprocket having a tooth angle of zero degrees and illustrating other tooth angles.

Figure 1:
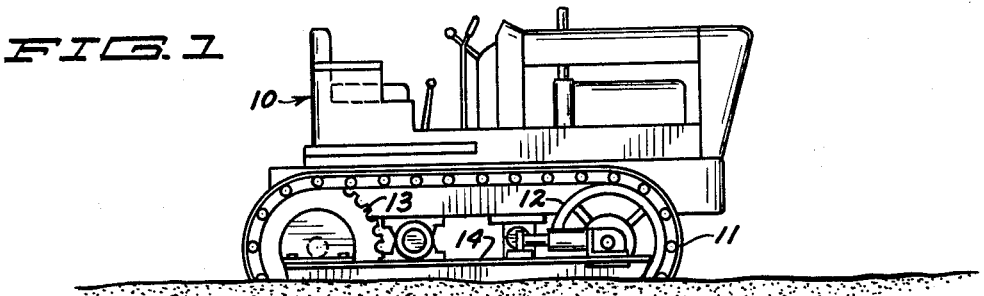
FIG. 1 is a side elevational view of a crawler tractor working in sandy or loose soil conditions.

Referring to the drawings and the numerals of reference thereon, a crawler-type tractor illustrated generally at 10 is propelled over the ground through the instrumentality of a pair of tracks 11, 11 each of which is mounted over an idler sprocket 12 and a drive sprocket 13. A track frame 14 is mounted to the tractor 10 and serves to strengthen and support the track assembly.

The drive sprocket 13 is mounted on a drive axle 15 that in turn is driven by the crawler tractor engine and associated mechanism. The track 11 is made up of a plurality of track shoes 16 that are bolted onto a track chain 17 which in turn consists of a plurality of links 20 that are pivotally joined together with pins 21. The pins 21 have bushings or rollers 22 mounted on them.

Figure 2:
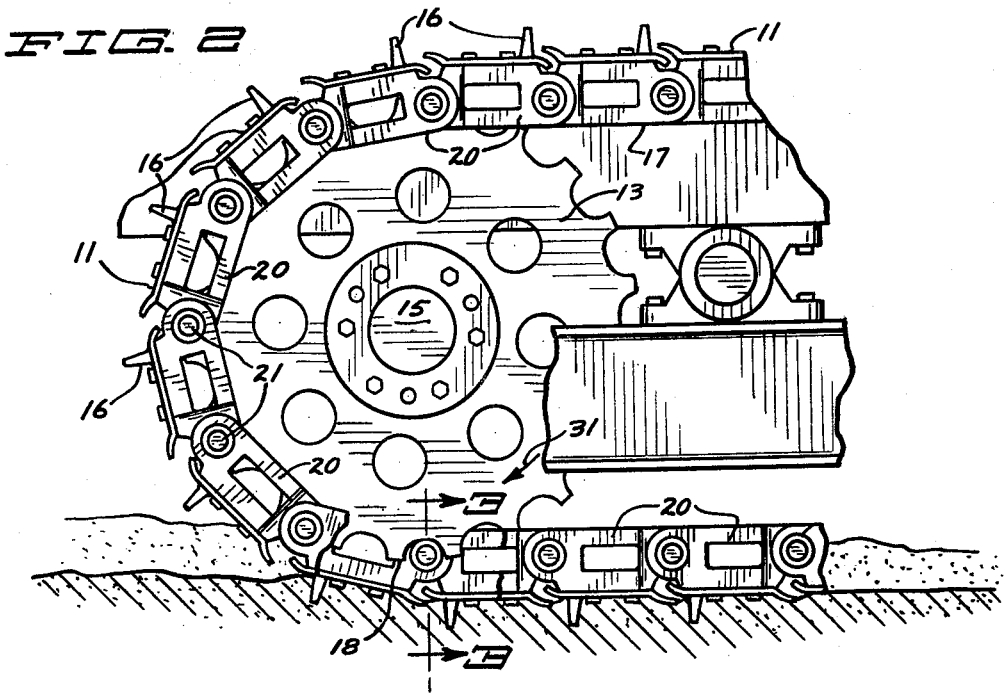
FIG. 2 is a fragmentary enlarged side elevational view of the rear portion of the crawler tractor of FIG. 1 showing a drive sprocket used to drive one of the tracks of the tractor with parts in section and parts broken away.
Figure 3:
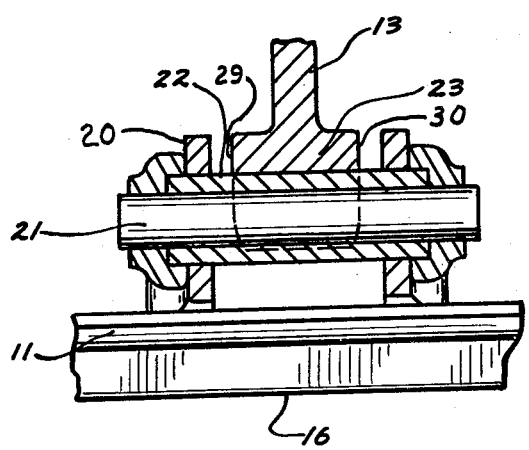
FIG. 3 is a vertical sectional view taken as on line 3—3 in FIG. 2.

The drive sprocket 13 has a plurality of teeth 23 around the outer periphery thereof. In loose sand conditions, where the tracks sink below the surface of the soil, such as illustrated in FIG. 1 and FIG. 2, sand will tend to cover the lower portions of the chain 17 and the sprockets 12 and 13 will often be running in sand. When this happens sand carried by the chain will be forced by the bushing 22 into a root area or bushing receptacle 19 between adjacent teeth.

In order to best understand the structure of the invention, the difficulties previously encountered which have already been discussed should be kept in mind.

A number of different sprocket and chain drive mechanisms have been advanced previous to the present invention to try to overcome these serious difficulties. One attempt at this was to cut away portions of the bushing receptacles in order that foreign materials could be forced upwardly between and through the teeth. Since this necessarily reduced the contact surface between the bushing and the bushing receptacle, excessive wear resulted from such an arrangement. Also, since the foreign material was not forced out of the bushing receptacle below the sprocket, but was forced up through the sprocket teeth, it tended to ride around with the sprocket and to cause difficulties and troubles all around.

It has been suggested that the way to overcome this difficulty is to prevent the bushing from seating into the bottom of the bushing receptacle by providing a ring around the periphery of the sprocket to effectively bring the pitch diameter of the sprocket out so that the bushing never seats into the base of the bushing receptacle but operates on the tooth face only. The difficulty with this structure is, of course, that there must always be some point at which the bushing rests on the roots or side of the tooth, and at this point, compaction will take place as long as the drive is running in sand. The compaction forces at this point will be roughly comparable to the compaction forces when the bushing rides clear into the base of the receptacle. Some compaction of the sand will take place at that point, and there will be additional build up until the effective "root" between the teeth of the sprocket (as increased by the compacted sand) once again causes the same excess forces to be brought into play and causes the same difficulties as previously described.

These problems were not solved until the sprocket and chain drive of the present invention was developed.

The structure of the sprocket made according to the present invention will be defined in terms of the development of the individual teeth and bushing receptacles between those teeth by removal of material between adjacent teeth. See FIG. 6. Each tooth is first laid out by locating a radial center plane 24 in the space between adjacent teeth. This plane is determined by the number of teeth on the sprocket. As best seen in FIG. 6, when the center plane 24 between adjacent teeth has been determined, a pair of radius or axis lines 25, 25 are located at each side of and parallel to this center plane 24 and radially outwardly from the center of rotation of the sprocket 13 about the axis of axle 15 a distance substantially equal to the desired pitch radius of the sprocket. Determination of the proper pitch radius for use with a chain of a particular pitch will be explained later.

The lines or axes 25, 25 will also be parallel to the axis of the sprocket and of the axle 15. The circumferential distance from the radial center plane 24 to each of the lines 25 can vary but a spacing of approximately 1/7 of the diameter of the chain bushing has been found to be satisfactory.

The space between adjacent teeth is partially defined by a pair of part-cylindrical surfaces 27 that join first and second parallel side surfaces 29 and 30 of the sprocket. Each of said part-cylindrical surfaces 27 has a radius equal to the radius of the chain bushing 22, with their respective axes along lines 25, 25. A pair of plane tooth faces 28, 28 one tangent to each of the part-cylindrical surfaces 27, each extend outwardly at a suitable angle with respect to the center plane 24. A tooth angle of from 18 to 22 degrees has proved excellent, while tooth angles from 0 to about 30 degrees are workable. A substantially plane root surface 26 is tangent to both of the cylindrical surfaces 27. This surface 26 provides a relief for the cylindrical surfaces. The length of the substantially plane surface 26 is determined by the distance that lines 25, 25 are spaced from center plane 24.

The profile of the tooth face opposite the driving face need not include a part-cylindrical surface such as 27 if the sprocket is never to be driven in a reverse direction.

The effective pitch of the sprocket under ideal conditions and without foreign materials present can be defined as the distance between the line 25 forming an axis for the part-cylindrical surface 27 associated with a first bushing of the chain and the corresponding line or axis 25 associated with the next adjacent bushing of said chain.

The pitch of the chain itself is defined as the distance between the axis of one bushing and the axis of the next adjacent bushing.

In a drive made according to the present invention, the pitch of the sprocket is less than the pitch of the chain working in that sprocket. Thus for use with a particular chain, the pitch radius of the sprocket will be less than the pitch radius of a sprocket of the prior art designed to operate with that chain. That is to say the lines 25, 25 will be closer to the axis of the sprocket 13 than was thought theoretically correct for use with a particular chain previous to the present invention.

The relationship of the bushings to the bushing receptacles where the pitch of the sprocket is less than the pitch of the chain is very clearly shown in FIGS. 4, 5, 6 and 7.

FIGS. 4, 5 and 6 illustrate a drive sprocket having a tooth angle of about 22 degrees, while FIG. 7 illustrates how a sprocket having a zero degree tooth angle will work.

In FIGS. 4, 5 and 6 the relationship of a particular bushing 35 with respect to its aligned bearing receptacle will be discussed. An immediately preceding bushing is identified as bushing 36; and the next oncoming bushing is designated 27.

In FIGS. 4 and 5, the particular bushing 35 is shown at the point where it first contacts its bearing receptacle. Because the preceding bushing 36 is in mating relationship with part-cylindrical portion 27 of its aligned bearing receptacle, and because the pitch of chain exceeds that of the sprocket, the bushing 35 contacts the tooth face 25 in outwardly spaced relationship to the part-cylindrical portion 27. Similarly because of this difference in pitch, a bushing 38 ahead of bushing 36 has moved ahead in its bearing receptacle until it no longer contacts its tooth face 25. As the bushings move around with the sprocket, this distance from the working faces increases. This allows a smaller, steeper tooth angle to be used without the chain bushing becoming "hooked on" at the point where it should leave the sprocket. That this does not happen with the present invention is illustrated by a bushing 39 which has just left the sprocket and the family of positions this bushing has taken in leaving, as indicated in dotted lines. See FIG. 4.

Similarly, see FIG. 7, where bushings in the same positions are identically numbered. Here even with a zero degree tooth angle, the bushing 39 moves away from the sprocket without interference from its adjacent tooth.

From the relative positioning in FIGS. 4 and 5, the bushing 35 is shown in FIG. 6 as having moved into its "locked in" position. That is to say, the resultant of the forces acting on it now tend to cause it to slide down into contact with part-cylindrical portion 27, and it has moved to that relationship. The next preceding bushing 36 (not shown) in FIG. 6 will be completely unloaded and spaced from its tooth face, and bushing 37 is now the one that is contacting its tooth face spaced from the part-cylindrical portion.

With the parts in this position, virtually all of the load transmitted by the sprocket is being transmitted through bushing 35. The great force thus exerted in forcing bushing toward the part-cylindrical portion tends to pulverize any sand or other foreign matter. This sand cannot stand without lateral support and is forced out from between the bushing and its receptacle.

As illustrated in FIG. 7, any one of a number of tooth angles will be usable. When a larger, flatter tooth angle is used, the bushing may get slightly farther around the sprocket before it is pulled down into the bearing receptacle; but at the point that the bushing does snap down into contact with the part-cylindrical portion, it is carrying virtually all of the power drive load, and will operate as described.

Since the design of the drive mechanism of the invention results in the elimination of the tendency of the sprocket to stretch each link of chain, the maximum power necessary to operate the crawler drive is greatly reduced.

When operating this drive in sand or other foreign materials, some build up of foreign matter may still occur and this will cause the chain bushings to operate out of the roots of the bushing receptacles at a somewhat enlarged pitch diameter. This will not tend to cause the bushing 22 to ride up on the tooth faces 28, however, until and unless this enlarged pitch diameter exceeds the pitch diameter of a sprocket having the same pitch as that of the roller chain.

In other words, the drive of the present invention can operate without harm to the chain or to the sprocket and without excessive drag or friction as long as the chain operates at a pitch diameter anywhere from that of the sprocket of the invention to that of an imaginary sprocket having the same effective pitch as that of the chain.

As pointed out in discussing sprocket and chain drives used before the present invention, as soon as any foreign materials separate the bushing from the bushing receptacle, there is necessarily a dragging movement of the bushing up the tooth face of the bushing receptacle as the bushing and sprocket move around from the position underneath the sprocket to position on top thereof.

The movement of the bushing of the present invention with respect to its bushing receptacle is in the opposite direction, however. That is to say the bushing moves progressively farther away from the part-cylindrical portion 27 of its bushing receptacle as it moves with the sprocket from bottom to top position. It will be evident that no wear to the working surface of the part-cylindrical portion 27 or of the tooth face 28 can occur as the bushing and bushing receptacle moves around the axle 15 with the sprocket 13.

What is claimed is:

1. In a crawler tractor having a power output axle and a pair of endless tracks positioned on opposite sides of said crawler tractor and driven by said output axle, each of said tracks having a separate endless chain portion comprising a plurality of links having spaced side members with transverse, cylindrical, equally spaced, sprocket engaging bushings of a single uniform diameter extending between said side members, the improvement comprising a pair of drive sprockets mounted on said power output axle and each engaging the chain portion of one of said tracks, each of said sprockets having first and second side surfaces and a plurality of teeth evenly spaced along the outer periphery thereof, adjacent teeth partially defining bushing receiving receptacles, said receptacles being further defined by a pair of part-cylindrical surfaces of said uniform diameter extending between said first and second side surfaces of said sprocket, said part-cylindrical surfaces having separate spaced parallel axes, said axes being spaced on opposite sides from a plane extending radially outwardly from the center of said sprocket and bisecting said receptacle, said axes further being situated substantially parallel to the center of rotation of said sprocket, a plane root surface tangent to each of said part-cylindrical surfaces and situated substantially normal to said radial plane, and a pair of outer plane faces, each tangent to one of said part-cylindrical surfaces extending outwardly at an angle of not more than 22 degrees with respect to said radial plane, the effective pitch of said sprocket being less than the pitch of its mating chain.

2. In a crawler tractor having a power output axle and a pair of endless tracks positioned on opposite sides of said crawler tractor and driven by said output axle, each of said tracks having a separate endless chain portion comprising a plurality of links having spaced side members with transverse, cylindrical, equally spaced, sprocket engaging bushings of a single uniform diameter extending between said side members, the improvement comprising a pair of drive sprockets mounted on said power output axle and each engaging the chain portion of one of said tracks, each of said sprockets having first and second side surfaces and a plurality of teeth evenly spaced along the outer periphery thereof, adjacent teeth partially defining bushing receiving receptacles, said receptacles being further defined by a pair of part-cylindrical surfaces of said uniform diameter extending between said first and second side surfaces of said sprocket, said part-cylindrical surfaces having separate spaced parallel axes, said axes being spaced a distance equal to at least one-eighth the diameter of said bushings on opposite sides from a plane extending radially outwardly from the center of said sprocket and bisecting said receptacle, said axes further being situated substantially parallel to the center of rotation of said sprocket, a plane root surface tangent to each of said part-cylindrical surfaces and situated substantially normal to said radial plane, and a pair of outer plane faces, each tangent to one of said part-cylindrical surfaces extending outwardly at an angle of not more than 22 degrees with respect to said radial plane, the effective pitch of said sprocket being less than the pitch of its mating chain.

3. A power transmission drive for transmitting power between a sprocket and a chain along a load line coincident with a substantially straight portion of said chain and tangent to an effective pitch diameter of said sprocket at a first point where said straight chain portion joins said sprocket, said drive including a sprocket having spaced teeth and bearing receptacles of at least partially arcuate profile between said teeth and a flexible chain comprising a plurality of links including equally spaced sprocket engaging members and side members connecting adjacent sprocket engaging members, each tooth being provided with a tooth face tangent to said bearing receptacle and positioned to be in adjacent, contacting, pressure bearing relation to a sprocket engaging member as said member moves into said receptacle, the pitch of said chain from sprocket engaging member to sprocket engaging member being greater than the pitch of said sprocket when said sprocket is in power transmitting relationship to said chain thus to cause the pressure between a particular sprocket engaging member and adjacent bearing receptacle-tooth face surfaces to increase from zero at the point before first contact as said member moves into said receptacle to a maximum before the next sprocket engaging member engages a tooth surface to zero as said next sprocket engaging member takes over the load, the tooth angle of the tooth face of a particular tooth being such that the resultant force on its adjacent sprocket engaging member tends to cause said member to move to the root of said receptacle when the pressure on said sprocket engaging member is at said maximum.

4. The combination with a chain comprising a plurality of links having spaced side members with transverse, cylindrical, equally spaced, sprocket engaging bushings of a single uniform diameter extending therebetween, of: a rotatably mounted sprocket drivingly associated with said chain; said sprocket having first and second side surfaces and a plurality of teeth evenly spaced along the outer periphery thereof; adjacent teeth partially defining bushing receiving receptacles; said receptacles being further defined by a pair of part-cylindrical surfaces of said uniform diameter extending between said first and second side surfaces of said sprocket, said part-cylindrical surfaces having separate axes, said axes being in spaced parallel relation to each other and being spaced equal distances on opposite sides from a plane extending radially outwardly from the center of said sprocket, said axes further being situated substantially parallel to the center of rotation of said sprocket, a plane root surface tangent to each of said part-cylindrical surfaces and situated substantially normal to said radial plane, and a pair of outer plane faces, each tangent to one of said part-cylindrical surfaces and extending outwardly at an angle of from 18 to 22 degrees with respect to said radial plane; the pitch of said sprocket being less than the pitch of said chain.

5. The combination as specified in claim 4 wherein the distance from each of said axes of said part-cylindrical surfaces to said radial plane is equal to at least 1/8 the diameter of said chain bushings.

References Cited by the Examiner
UNITED STATES PATENTS

| 1,258,606 | 3/18 | Holt | 74—243 X |
| 1,963,249 | 6/34 | Rorabeck | 74—243 |
| 2,188,025 | 1/40 | Weiss | 74—243 X |
| 2,529,168 | 11/50 | Marshall et al. | 74—243 |
| 2,827,337 | 3/58 | Buffum | 305—57 X |

DON A. WAITE, *Primary Examiner.*